E. A. PALMER.
Measuring Faucet.
No. 14,734.  Patented April 22, 1856.
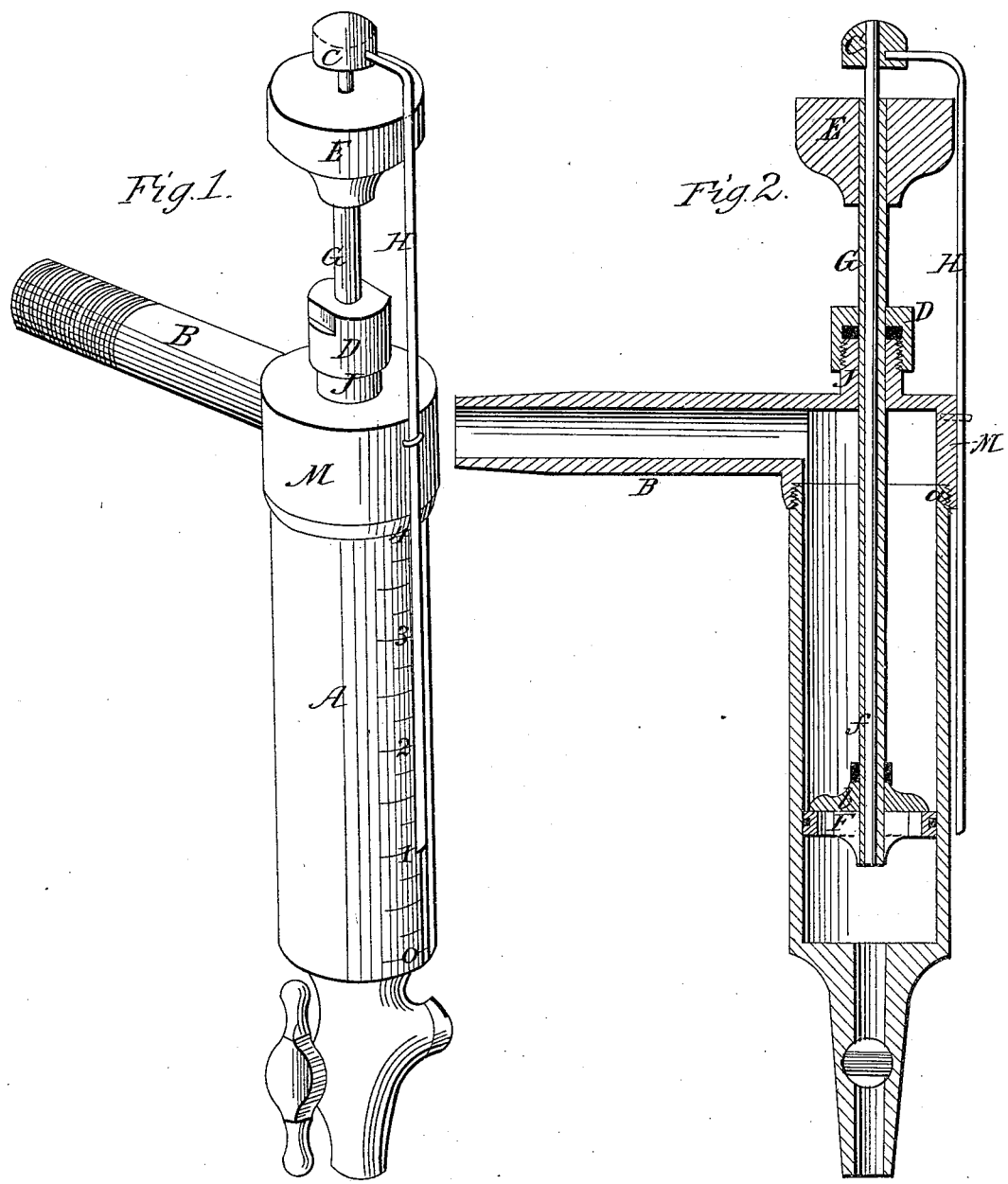

UNITED STATES PATENT OFFICE.

EDWIN A. PALMER, OF PARIS, NEW YORK.

MEASURING-FAUCET.

Specification of Letters Patent No. 14,734, dated April 22, 1856.

*To all whom it may concern:*

Be it known that I, EDWIN A. PALMER, of Clayville, in the county of Oneida and State of New York, have invented a new and useful Improvement on Faucets for Measuring Liquid Substance when it is Taken from the Cask; and I do hereby declare that the following is a full, clear, and exact description of the construction and operation of the same, reference being had to the annexed drawings, making a part of this specification, in which—

Figure 1 is a perspective view showing a faucet for measuring liquid substance. Fig. 2 is a vertical section (one half of the faucet being removed).

The same letters refer to like parts in both figures.

A is a hollow cylinder of sufficient capacity to hold any required quantity; it has a scale on the front side which divides its length into 4 equal parts as shown by figures 0, 1, 2, 3, 4, each of those parts is subdivided into 4 equal parts.

M is the head of the cylinder which is fastened to it by a screw at *a*, Fig. 2.

B is a tube running from the head M to the cask to convey the liquid to the cylinder.

E is a knob of sufficient weight to keep the valve closed.

G is a small tube the upper end passing through the knob E, then down through the packing box D into the cylinder and through the valve *b* which is fastened to the lower end loosely so that it will adjust itself to the piston F which is perforated to let the liquid pass down through when the valve is up. The piston F has a rod *f* running up through the whole length of the tube G and into hub C leaving a space between the hub, and knob of ¼ of an inch or more as the case may require for the purpose of opening the valve when desired. From the hub C is a half-round wire H which runs out over the knob and down the outside of the cylinder even with bottom of the piston which serves as an index to show the place the piston occupies. On the lower end of the wire is a device of some kind to prevent the wire from being shortened so that the proper quantity may always be measured off; and thus prevent the deception which might be practiced.

D is a small cap which screws onto the hub J to secure the packing around the tube G and make it perfectly tight. In the edge of the piston is a groove *e*, turned for packing to make that perfectly tight in the cylinder also. At the lower end of the cylinder is a common stop cock.

To operate the faucet, it being screwed into the cask, or otherwise fastened thereto with the cylinder A perpendicular, it being full, with the piston at the bottom of the cylinder, as will be seen when the index is at the first mark on the scale at the bottom, raise the knob E up to the hub C, which opens the valve *b* and leaves a sufficient opening for the liquid to pass down; when the piston is raised up, which is done by continuing to raise upon the knob until raised to the desired place indicated by the index on the scale. When this is done, let go of the knob and it will close the valve. Thus the desired quantity is divided off. Then set the vessel under and turn the stop cock. As the liquid runs out the piston follows down to its proper place, and the measure is again filled. In this way and with this arrangement any desired quantity may be drawn from a cask with accuracy.

I do not claim any of the principles involved in the common faucet or stop cock, which is generally known; but

What I claim as my invention and desire to secure by Letters Patent is—

The perforated piston F in combination with the valve *b* and knob E, arranged substantially as described and for the purposes set forth.

EDWIN A. PALMER.

Witnesses:
HENRY S. SMITH,
HENRY C. ROGERS.